United States Patent
Murakami

(10) Patent No.: US 7,895,322 B2
(45) Date of Patent: Feb. 22, 2011

(54) SESSION MANAGEMENT METHOD FOR COMPUTER SYSTEM

(75) Inventor: Toshihiko Murakami, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 307 days.

(21) Appl. No.: 12/124,460

(22) Filed: May 21, 2008

(65) Prior Publication Data

US 2009/0248857 A1    Oct. 1, 2009

(30) Foreign Application Priority Data

Mar. 28, 2008    (JP) .............................. 2008-085906

(51) Int. Cl.
*G06F 15/173*    (2006.01)
(52) U.S. Cl. ...................... 709/224; 709/213; 709/230; 713/193
(58) Field of Classification Search .................. 709/224
See application file for complete search history.

(56) References Cited

U.S. PATENT DOCUMENTS

| 5,875,462 | A  | * | 2/1999  | Bauman et al. ............. 711/119 |
| 6,298,407 | B1 | * | 10/2001 | Davis et al. ................. 710/314 |
| 6,990,478 | B2 | * | 1/2006  | Loy et al. ........................ 1/1 |
| 7,406,525 | B2 | * | 7/2008  | Higgins et al. .............. 709/227 |
| 2002/0137015 | A1 | * | 9/2002 | Guinta et al. ............... 434/323 |
| 2005/0216331 | A1 | * | 9/2005 | Ahrens et al. ................ 705/11 |
| 2006/0075114 | A1 | * | 4/2006 | Panasyuk et al. ........... 709/227 |
| 2006/0212719 | A1 | * | 9/2006 | Miyawaki et al. .......... 713/189 |
| 2007/0204110 | A1 | * | 8/2007 | Guthrie et al. .............. 711/141 |

OTHER PUBLICATIONS

IETF RFC3720, Internet Small Computer Systems Interface (iSCSI).
"Reliability Problem Latent in TCP Protocol", Jul. 16, 2004, JPCERT Coordination Center.

* cited by examiner

*Primary Examiner*—Wing F Chan
*Assistant Examiner*—Tesfay Yohannes
(74) *Attorney, Agent, or Firm*—Brundidge & Stanger, P.C.

(57) ABSTRACT

There is provided a session management method for a computer system including an initiator, and a storage system coupled to the initiator via a network. The initiator includes an interface coupled to the network, a processor and a memory. The storage system includes an interface coupled to the network, a memory and a processor. The session management method comprising the steps of: executing, by the initiator, health check for diagnosing a status of a session established between the initiator and the storage system in the case of which no data is input/output to/from the storage device for a first predetermined period; and cutting off and re-establishing, by the initiator, the session with the storage system at a timing of executing the health check in the case of which no data is input/output to/from the storage system for a second predetermined period.

15 Claims, 13 Drawing Sheets

| iSCSI SESSION | | TCP CONNECTION | | | POSSIBLE REFRESH METHOD |
|---|---|---|---|---|---|
| ID | STATUS | INFORMATION | VALUE | | |
| B1 | NORMAL | CONNECTION ID | C1 | | • AT TIME OF HEALTH CHECK ISSUE |
| | | TRANSMISSION SOURCE IP ADDRESS | 192.168.10.10 | | |
| | | TRANSMISSION SOURCE TCP PORT | 6001 | | |
| | | TRANSMISSION DESTINATION IP ADDRESS | 192.168.20.10 | | |
| | | TRANSMISSION DESTINATION TCP PORT | 3260 | | |
| | | CONNECTION STATUS | NORMAL | | |
| B11 | NORMAL | CONNECTION ID | C11 | C12 | • AT TIME OF HEALTH CHECK ISSUE<br><br>• AT TIME OF MULTI-TCP CONNECTION |
| | | TRANSMISSION SOURCE IP ADDRESS | 192.168.10.10 | 192.168.10.10 | |
| | | TRANSMISSION SOURCE TCP PORT | 6011 | 6012 | |
| | | TRANSMISSION DESTINATION IP ADDRESS | 192.168.20.10 | 192.168.20.10 | |
| | | TRANSMISSION DESTINATION TCP PORT | 3260 | 3260 | |
| | | CONNECTION STATUS | NORMAL | NORMAL | |

*FIG. 4*

| iSCSI SESSION | | TCP CONNECTION | | POSSIBLE REFRESH METHOD | |
|---|---|---|---|---|---|
| ID | STATUS | INFORMATION | VALUE | | |
| B1 | NORMAL | CONNECTION ID | C1 | • AT TIME OF HEALTH CHECK ISSUE<br><br>• AT TIME OF MULTI-iSCSI SESSION (WITH B2) | 1401 |
| | | TRANSMISSION SOURCE IP ADDRESS | 192.168.10.10 | | |
| | | TRANSMISSION SOURCE TCP PORT | 6001 | | |
| | | TRANSMISSION DESTINATION IP ADDRESS | 192.168.20.10 | | |
| | | TRANSMISSION DESTINATION TCP PORT | 3260 | | |
| | | CONNECTION STATUS | NORMAL | | |
| B2 | NORMAL | CONNECTION ID | C2 | • AT TIME OF HEALTH CHECK ISSUE<br><br>• AT TIME OF MULTI-iSCSI SESSION (WITH B1) | 1402 |
| | | TRANSMISSION SOURCE IP ADDRESS | 192.168.10.10 | | |
| | | TRANSMISSION SOURCE TCP PORT | 6011 | | |
| | | TRANSMISSION DESTINATION IP ADDRESS | 192.168.20.10 | | |
| | | TRANSMISSION DESTINATION TCP PORT | 3260 | | |
| | | CONNECTION STATUS | NORMAL | | |

*FIG. 14*

SESSION MANAGEMENT METHOD FOR COMPUTER SYSTEM

CLAIM OF PRIORITY

The present application claims priority from Japanese patent applications JP 2008-85906 filed on Mar. 28, 2008, the content of which are hereby incorporated by reference into this application.

BACKGROUND

This invention relates to a technology of managing a session with a storage device connected via a network.

An internet SCSI (iSCSI) is a technology of transmitting/receiving a SCSI command used for communication between a storage device and a computer via an IP network (refer to IETF RFC3720, "Internet Small Computer Systems Interface (iSCSI)").

According to the iSCSI, an iSCSI session is maintained between an initiator and a target for a long time. The iSCSI session includes a transmission control protocol (TCP) connection (also referred to as a session). If the TCP connection is maintained for a long time, there is a possibility that a TCP segment forged by an attacker may cause a cut-off of a connection in the middle of communication or an insertion of data ("problem of reliability latent in TCP protocol"). For the "reliability problem latent in TCP protocol", use of a border gateway protocol (BGP) is cited as an example of maintaining the TCP connection for a long time. However, when the TCP connection of the BGP is cut off, a routing table has to be reconstructed, giving concern about a wide-ranging influence in terms of availability.

The iSCSI enables, when the TCP connection is cut off, recovery by executing re-establishment via the initiator, and subsequently transmitting a SCSI command and SCSI data again between the initiator and the target. However, a data loss may occur.

"Reliability Problem Latent in TCP Protocol", Jul. 16, 2004, JPCERT Coordination Center, discloses a method which uses a TCP message digest 5 (MD 5) authentication option or an IP security (IPsec) for the TCP connection maintained for a long time. It also discloses a method of filtering a TCP segment forged by an attacker by passing only TCP segments from correct transmission sources via a packet filtering function of a switch or a router.

SUMMARY

In the case of the conventional technology, an MD 5 authentication option or an IPsec has to be mounted in a product, or packet filtering has to be set in a network device. Thus, a problem of an increase in the number of developing or setting steps inevitably occurs. The actual mounting of such a function or the actual setting of packet filtering may cause a reduction in performance.

A representative aspect of this invention is as follows. That is, there is provided a session management method for a computer system including an initiator, and a storage system coupled to the initiator via a network. The initiator includes a first interface coupled to the network, a first processor coupled to the first interface, and a first memory coupled to the first processor. The storage system includes a second interface coupled to the network, a second memory coupled to the second interface, and a second processor coupled to the second memory. The session management method comprising the steps of: executing, by the initiator, health check for diagnosing a status of a session established between the initiator and the storage system in the case of which no data is input/output to/from the storage device for a first predetermined period; and cutting off and re-establishing, by the initiator, the session with the storage system at a timing of executing the health check in the case of which no data is input/output to/from the storage system for a second predetermined period.

According to an exemplary embodiment of this invention, security can be improved by cutting-off a session and re-establishing (refreshing) the session to prevent long-time maintenance of a connection.

BRIEF DESCRIPTION OF THE DRAWINGS

The present invention can be appreciated by the description which follows in conjunction with the following figures, wherein:

FIG. 4 is an explanatory diagram showing an example of an iSCSI session management table in accordance with the first embodiment of this invention;

FIG. 14 is an explanatory diagram showing an iSCSI session management table in accordance with a second embodiment of this invention;

DETAILED DESCRIPTION OF THE PREFERRED EMBODIMENTS

Figure 1:
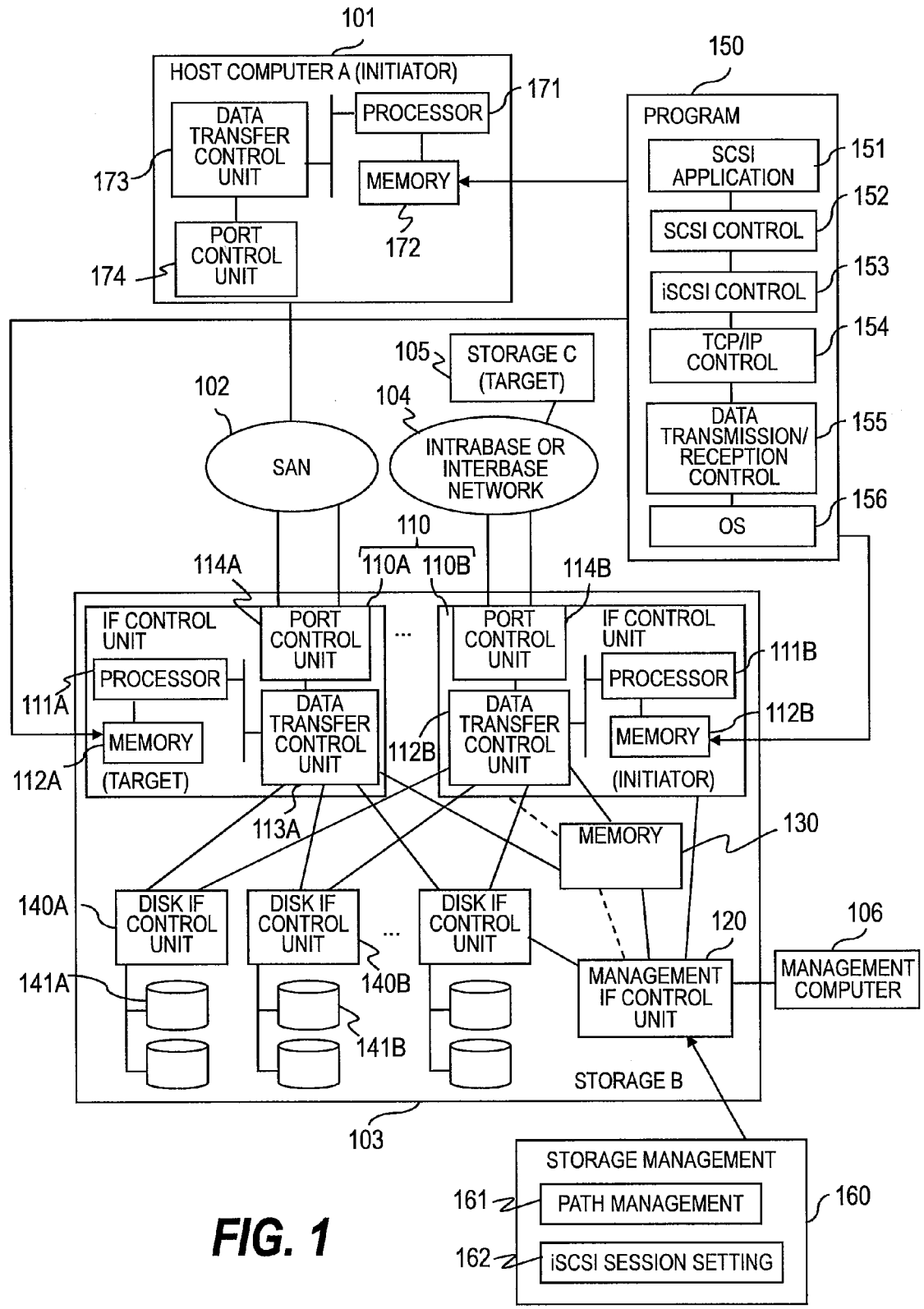
FIG. 1 is a block diagram showing an example of a configuration of a computer system in accordance with a first embodiment of this invention.

The preferred embodiments of this invention will be described below referring to the drawings.

First Embodiment

FIG. 1 illustrates an example of a configuration of a computer system according to a first embodiment of this invention.

The computer system of the first embodiment of this invention includes a host computer 101, storage systems 103 and 105, and a management computer 106.

The host computer 101 carries out an application process by using data stored in the storage system 103. The host computer 101 includes an interface for connection to the storage system 103, a processor 171, a memory 172, a data transfer control unit 173, and a port control unit 174.

The processor 171 carries out various processes by executing programs stored in the memory 172. The memory 172 stores the programs executed by the processor 171, and data used for executing the programs. The data transfer control unit 173 and the port control unit 174 controls transmission/reception of data to/from the storage system 103.

The memory 172 of the host computer 101 stores programs such as an operating system (OS) 156, data transmission/reception control 155, TCP/IP control 154, iSCSI control 153, SCSI control 152, and a SCSI application 151. Each program will be described below referring to FIG. 2.

The host computer 101 operates as an initiator for transmitting a command to the storage system 103 to transmit/receive data.

The storage system 103 is connected to the host computer 101 via a SAN 102. Generally, the SAN 102 is a network which includes a switch (not shown) and the like, and connected by a fibre channel or Ethernet ("Ethernet" is a registered trademark, similar hereinafter).

The storage system 103 is connected to the storage system 105 via an intrabase or interbase network. The storage system 105 stores, for example, backup data of data stored in the storage system 103. A configuration of the storage system 105 is similar to that of the storage system 103 described below.

The storage system 103 includes an interface (hereinafter, IF) control unit 110, a management IF control unit 120, a memory 130, and a disk IF control unit 140.

The IF control unit 110 includes an interface for the host computer 101 or the storage system 105. The IF control unit 110 connected to the host computer 101 is an IF control unit 110A, and the IF control unit 110 connected to the storage system 105 is an IF control unit 110B. Each component included in the IF control unit 110 is denoted by A or B added after a numeral. However, A or B will be omitted in the description below unless noted otherwise.

The IF control unit 110A operates as a target for receiving a command from the host computer 101 to transmit/receive data. On the other hand, the IF control unit 110B operates as an initiator for transmitting a command to the storage system 105 to transmit/receive data.

The IF control unit 110 includes a processor 111, a memory 112, a data transfer processing unit 113, and a port control unit 114.

The processor 111 executes a program for controlling data management and data transmission/reception. The memory 112 of the IF control unit 110 stores the program executed by the processor 111 and data used by the program. As in the case of the memory 172 of the host computer 101, the memory 112 stores an operating system (OS) 156, data transmission/reception control 155, TCP/IP control 154, iSCSI control 153, SCSI control 152, and a SCSI application 151.

The management IF control unit 120 is connected to the management computer 106 to receive management information and instructions entered from the management computer 106. The management IF control unit 120 stores storage management information 160. Specifically, the management IF control unit 120 stores path management information 161, iSCSI session setting information 162, and the like.

The memory 130 includes a cache memory (not shown) and a shared memory (not shown). The cache memory is an area for temporarily storing data transmitted/received to/from the host computer 101. The shared memory stores control information and configuration information of the storage system 103.

The disk IF control unit 140 controls a data reading/writing process, and is connected to a plurality of disks 141 for storing data transmitted/received to/from the host computer 101.

The management computer 106 transmits an instruction to the storage system 103, and stores control information and configuration information.

Figure 2:
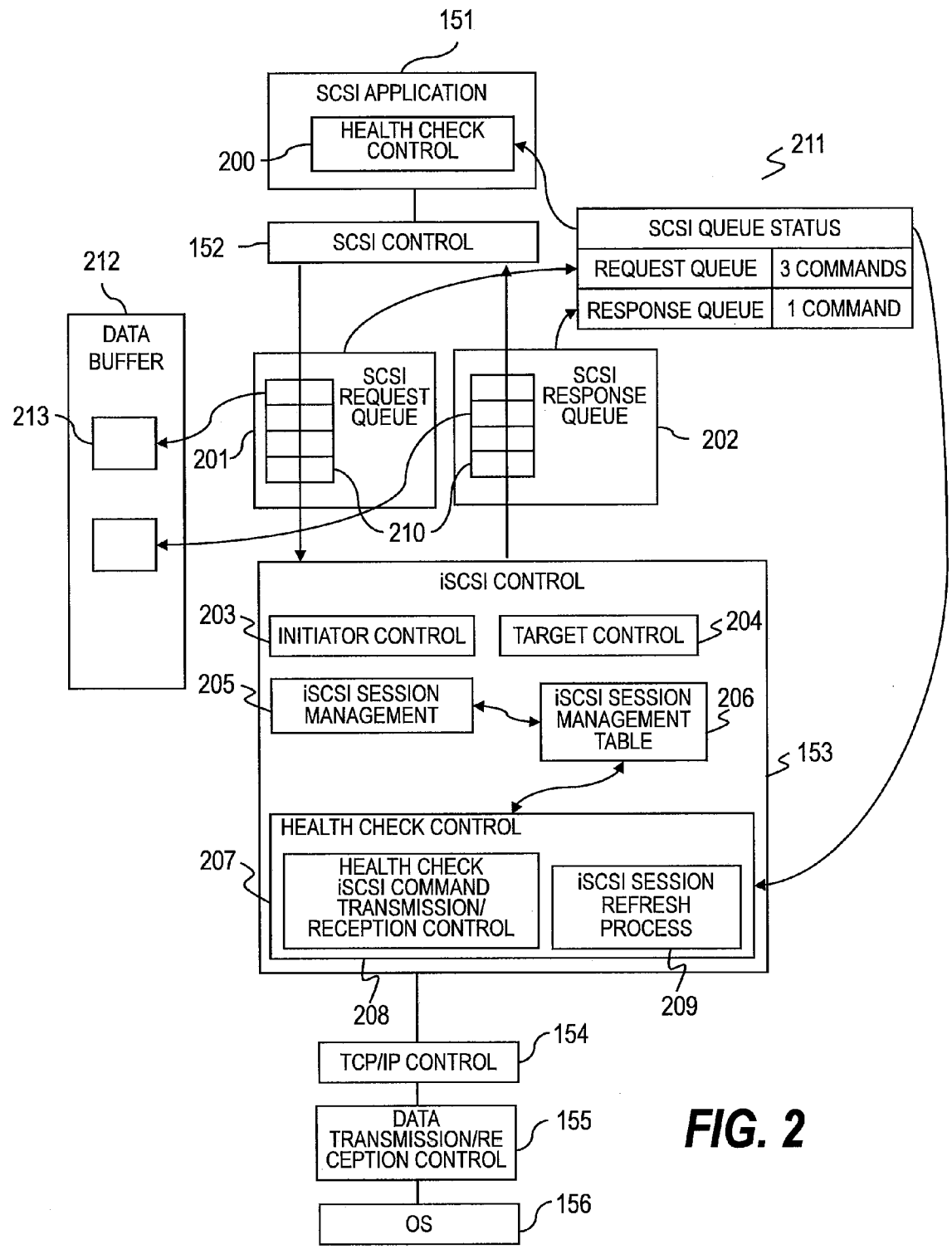
FIG. 2 is a block diagram showing a program and management information stored in a host computer or a memory of the storage in accordance with the first embodiment of this invention.

FIG. 2 illustrates, in detail, a program and management information stored in the host computer 101 or the memory 112 of the storage system 103 according to the first embodiment of this invention.

The memory 112 of the storage system 103 stores, as described above, the OS 156, the data transmission/reception control 155, the TCP/IP control 154, the iSCSI control 153, the SCSI control 152, and the SCSI application 151.

The OS 156 is basic software for managing and controlling computer resources. The data transmission/reception control 155 and the TCP/IP control 154 are programs for transmitting/receiving information to/from another host computer or storage system.

The iSCSI control 153 is a program for transmitting/receiving a SCSI command and data as IP packets. In the iSCSI control 153, initiator control 203 and target control 204 are main processes.

In the initiator control 203, a SCSI command is transmitted to a target. In the target control 204, the SCSI command transmitted from the initiator is received to execute the command such as data reading/writing as instructed. Thus, normally, the host computer 101 only needs to include the initiator control 203.

The iSCSI control 153 includes iSCSI session management 205 for managing an iSCSI session, and an iSCSI session management table 206. The iSCSI session management 205 may be partial processes of the initiator control 203 and the target control 204.

The iSCSI control 153 includes health check control 207. The health check control 207 is a program for checking normalcy of an iSCSI session connection, and includes health check iSCSI command transmission/reception control 208, and an iSCSI session refresh process 209 for re-establishing an iSCSI session.

Between the SCSI control 152 and the iSCSI control 153, a SCSI request queue 201 and a SCSI response queue 202 are provided to exchange a SCSI command and data. A data buffer 212 is also provided to temporarily store data read/written by the SCSI command. The SCSI request queue 201 or the SCSI response queue 202 stores, when storing the SCSI command or corresponding data, SCSI data 213 in the data buffer 212, and a command 210 which refers to the SCSI data 213. A SCSI queue status table 211 is provided to manage command storing statuses of the SCSI request queue 201 and the SCSI response queue 202.

The SCSI application 151 is a program for reading/writing data in the storage system 103 or 105. In the host computer 101, for example, a mail server or a database server corresponds to this application. For the SCSI application 151 in the storage system 103 or 105, an application for executing data copying in a storage system of a logical volume which includes a plurality of disks 141 or data copying between storages is an example. Health check control 200 may be provided to check normalcy of a connection between the host computer 101 and the storage system 103 or between the storage systems 103 and 105.

Figure 3:
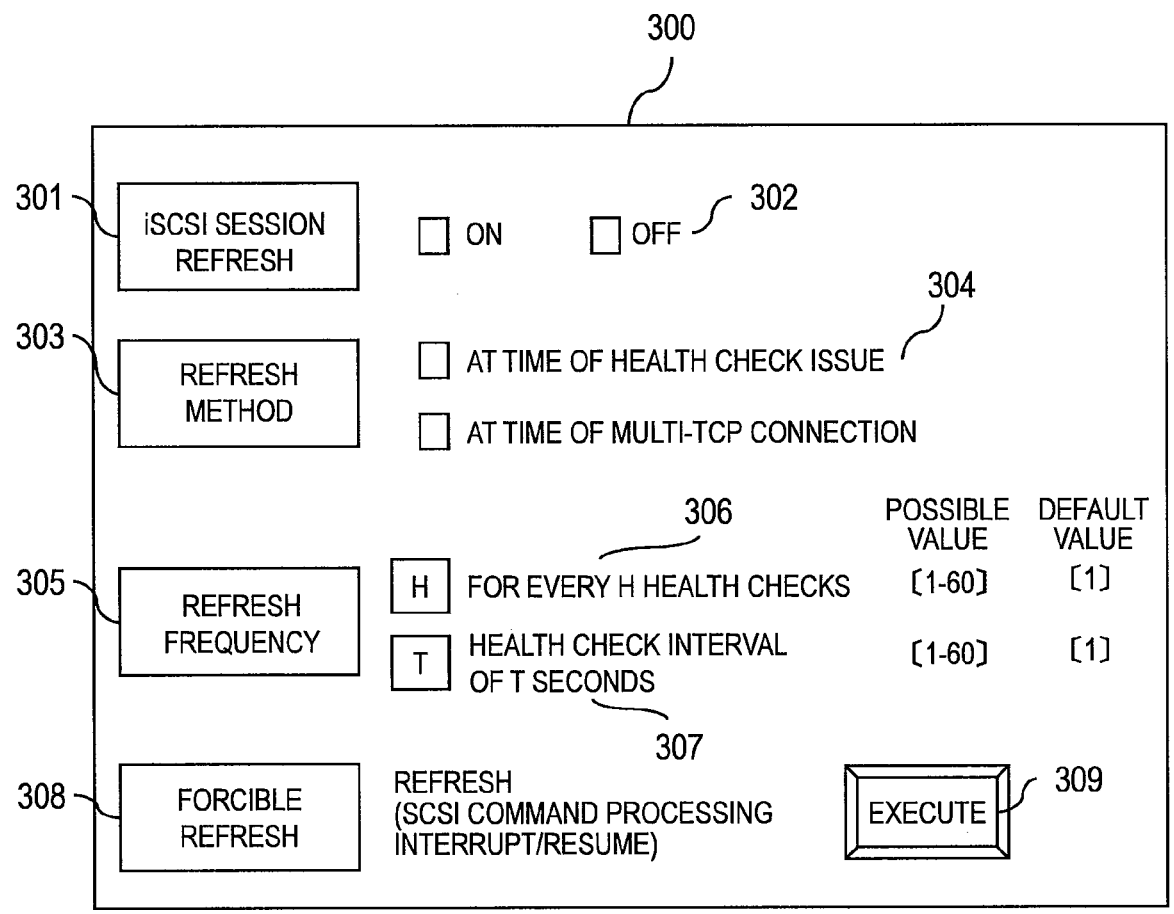
FIG. 3 is an explanatory diagram showing an example of a setting screen for instructing refresh of an iSCSI session in accordance with the first embodiment of this invention.

FIG. 3 illustrates an example of a setting screen for instructing refresh of an iSCSI session according to the first embodiment of this invention.

An iSCSI refresh setting screen 300 is for receiving a refresh execution instruction of an iSCSI session from a storage system or a system administrator, and displayed in the management computer 106 or the host computer 101.

The iSCSI refresh setting screen 300 includes refresh execution instruction units (301 and 302), refresh method setting units (303 and 304), refresh frequency setting units (305 to 307), and forcible refresh execution units (308 and 309).

The refresh execution instruction unit sets whether to execute refresh of an iSCSI session. "ON" is set when refresh of an iSCSI session is executed by predetermined timing.

The refresh method setting unit sets timing for executing refresh of an iSCSI session. In FIG. 3, "TIME OF HEALTH CHECK ISSUE" or "TIME OF MULTI-TCP CONNECTION" can be set. Each timing for executing refresh will be described below.

The refresh frequency setting unit sets a frequency of executing refresh. For example, refresh is set to be executed for every H health checks (306). A health check execution interval (every T seconds) can also be set (307).

The forcible refresh execution unit forcibly executes refresh by operating an execute button 309. In this case, a process by a SCSI command is interrupted. Upon completion of refresh, a command is retransmitted to resume the process.

FIG. 4 illustrates an example of an iSCSI session management table 206 according to the first embodiment of this invention.

The iSCSI session management table 206 stores management information of an iSCSI session. The iSCSI session management table 206 includes an iSCSI session 401, a TCP connection 404, and a possible refresh method 411.

The iSCSI session 401 includes a session ID 402 and a session status 403. The session ID 402 is an identifier for identifying an iSCSI session. The session status 403 indicates a status of an iSCSI session.

The TCP connection 404 includes a connection ID 405, a transmission source IP address 406, a transmission source TCP port 407, a transmission destination IP address 408, a transmission destination TCP port 409, and a connection status 410.

The connection ID 405 is an identifier for identifying a TCP connection. The transmission source IP address 406 and the transmission source TCP port 407 provide information for specifying a transmission source. The transmission destination IP address 408 and the transmission destination TCP port 409 provide information for specifying a transmission destination. A value of the transmission destination TCP port 409 is normally "3260" in the case of an iSCSI. However, other values may be set.

The connection status 410 indicates a status of a TCP connection. The possible refresh method 411 stores information for instructing the iSCSI session refresh process 209 about a refresh method executable for each iSCSI session 401. Specifically, "TIME OF HEALTH CHECK ISSUE" or "TIME OF MULTI-TCP CONNECTION" settable by the refresh method setting unit of FIG. 3 is set.

Figure 5:
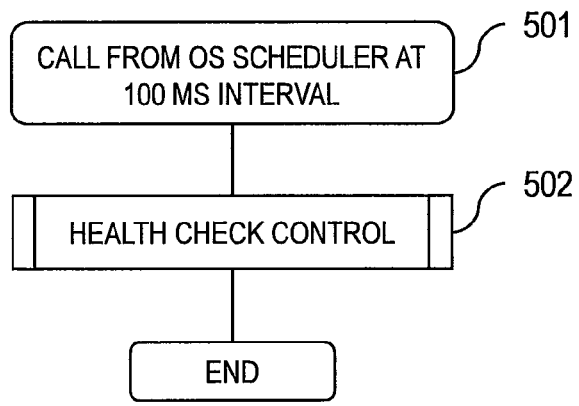
FIG. 5 is a flowchart showing a procedure of periodically executing health check control in accordance with the first embodiment of this invention.
Figure 6:
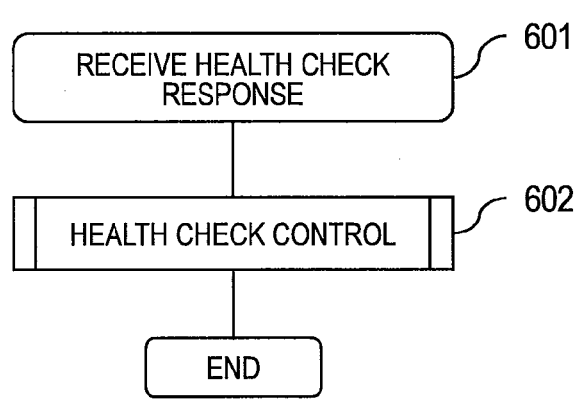
FIG. 6 is a flowchart showing a procedure of executing health check control at the time of receiving a health check response in accordance with the first embodiment of this invention.
Figure 7:
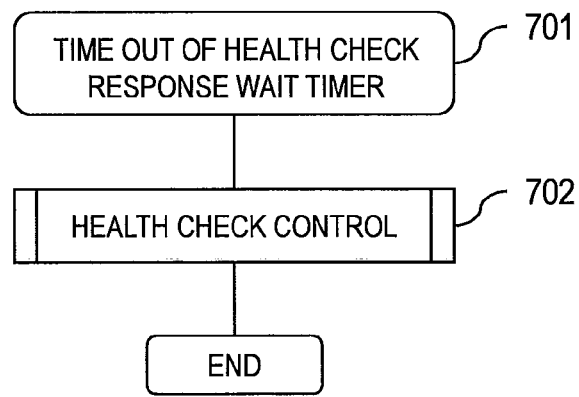
FIG. 7 is a flowchart showing a procedure of executing health check control when the timer reaches a timeout while waiting for a health check response in accordance with the first embodiment of this invention.

Each of FIGS. 5 to 7 illustrates timing for executing the health check control 207 included in the iSCSI control 153. The health check control 207 is normally set to be periodically executed from the OS.

FIG. 5 is a flowchart illustrating a procedure of periodically executing health check control according to the first embodiment of this invention.

This process is periodically executed at a timing of transmitting a health check iSCSI command from the initiator to the target. A health check iSCSI command may be transmitted from the target to the initiator.

According to the first embodiment of this invention, health check control is loaded from the OS at an interval of 100 ms (step 501). For example, by the SCSI application 151 of the host computer 101, a health check iSCSI command is transmitted to the storage system 103.

Upon reception of the health check iSCSI command, the processor 111A of the IF control unit 110A of the storage system 103 executes the health check control 207 (step 502).

FIG. 6 is a flowchart illustrating a procedure of executing health check control at the time of receiving a health check response according to the first embodiment of this invention.

This process is executed when a response is received from a transmission destination after transmission of a health check iSCSI command (steps 601 and 602).

The health check control 207 is executed when a timer for waiting for a response of the health check iSCSI command reaches a timeout.

FIG. 7 is a flowchart illustrating a procedure of executing health check control when the timer reaches a timeout while waiting for a health check response according to the first embodiment of this invention.

Upon transmission of a health check iSCSI command, a transmission source starts the timer for counting standby time until reception of a response from a transmission destination. A timeout is judged when time counted by the timer exceeds predetermined time (step 701) to execute health check control (step 702).

Figure 8:
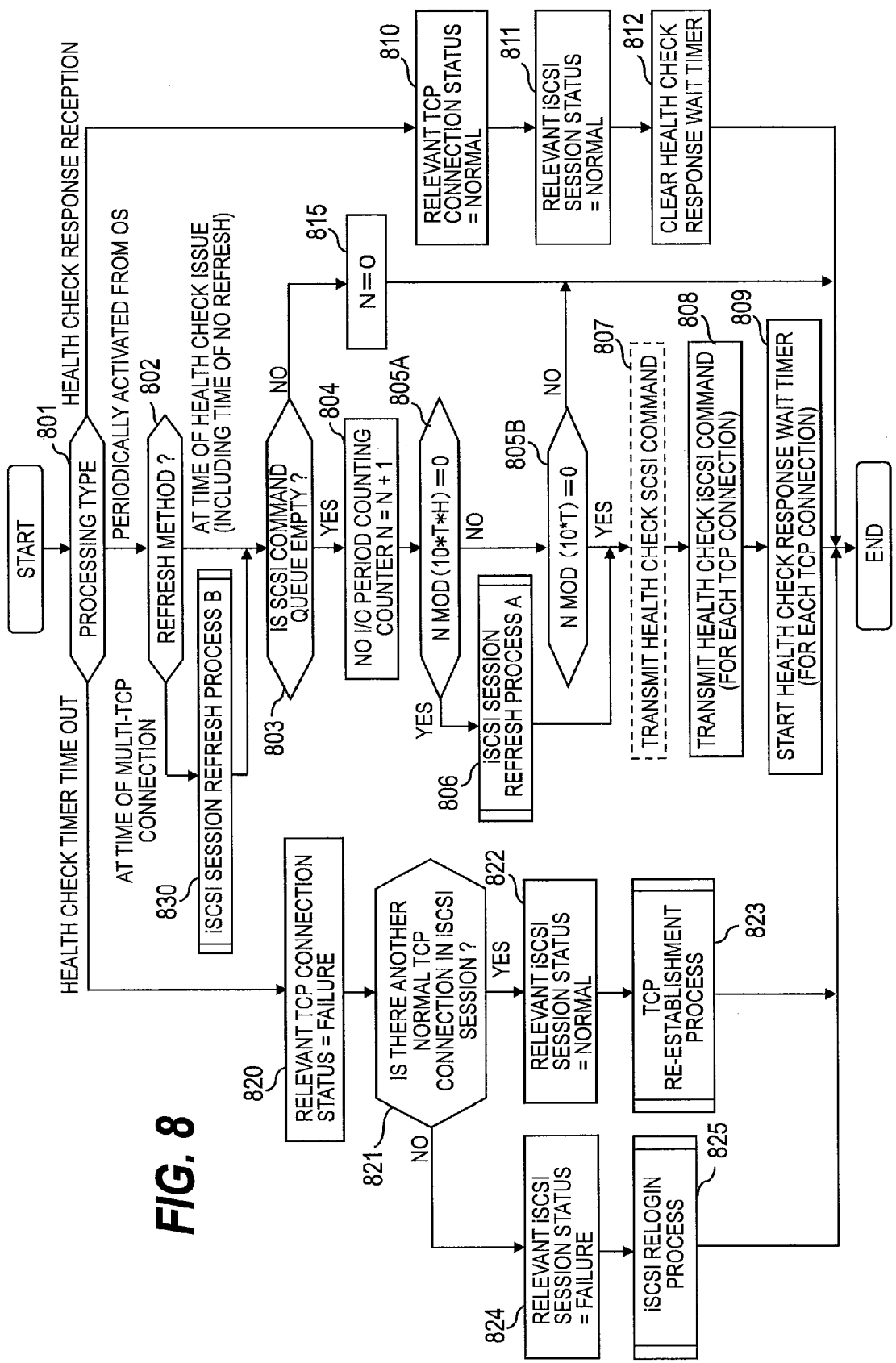
FIG. 8 is a flowchart showing a procedure of the health check control in accordance with the first embodiment of this invention.

FIG. 8 is a flowchart illustrating a procedure of the health check control 207 according to the first embodiment of this invention.

As described above, the health check control may be executed in the host computer 101 or the storage system 103. The first embodiment of this invention will be described below presuming that the health check control is executed in the host computer 101.

The processor 171 of the host computer 101 first judges a process type corresponding to a start form of health check control (step 801). As shown in FIGS. 5 to 7, the health check control 207 is executed on occasions of three types. Accordingly, the process is branched based on each corresponding process type.

When a process type is a periodical start from the OS (result of the step 801 is "PERIODICALLY STARTED FROM OS"), the processor 171 of the host computer 101 first judges a type of a refresh method (step 802).

When the refresh method is at the time of health check issue (result of the step 802 is "TIME OF HEALTH CHECK ISSUE"), the processor 171 of the host computer 101 refers to the SCSI queue status table 211 to judge whether a SCSI command queue is in an empty status (step 803). In the case of the time of health check issue, a case of no refresh is also included. When the refresh method setting unit of FIG. 3 selects both of "TIME OF HEALTH CHECK ISSUE" and "TIME OF MULTI-TCP CONNECTION", "TIME OF MULTI-TCP CONNECTION" is selected. It is because a process for executing health check (process of steps 803 and after) is executed after the refresh process.

If the SCSI command queue is not in an empty status (result of the step 803 is "NO"), data I/O in the storage system 103 is in a status of being executed. Thus, the processor 171 of the host computer 101 sets zero in a value of a counter N for counting a period of no I/O (step 815).

If the SCSI command queue is in an empty status (result of the step 803 is "YES"), the processor 171 of the host computer 101 adds 1 to the value of the counter N for counting the period of no I/O (step 804). The counter N for counting the period of no I/O indicates a variable temporarily stored in the memory 172. It is presumed that the counter N is set to 0 in an initializing process (not shown).

The processor 171 of the host computer 101 judges whether to execute refresh (step 805A). A case of setting in the iSCSI refresh setting screen 300 of FIG. 3 where refresh is executed for every H health checks with a health check execution interval set to T seconds will be described.

First, for health check periodically started form the OS, a start interval is 100 ms as described above. Accordingly, a value (N/10) obtained by dividing the counter N by 10 is seconds for which the empty status of the SCSI command queue continues. Because a health check execution interval is T seconds, health check is executed each time when a value of N/10 is a multiple of T. In other words, health check is executed each time when a value of N reaches a multiple of 10×T. Because refresh is executed for every H health checks, refresh is executed each time when a value of N reaches a multiple of 10×T×H. Thus, as described in the step 805A, refresh is executed when a remainder of dividing the value of N by 10×T×H is 0.

If refresh is judged to be executed (result of the step 805A is "YES"), the processor 171 of the host computer 101 carries out an iSCSI session refresh process A 806 (step 806). A procedure of the iSCSI session refresh process A will be described below referring to FIG. 9.

If refresh is judged not to be executed (result of the step 805A is "NO"), the processor 171 of the host computer 101 judges whether to execute health check (step 805B).

If health check is judged to be executed (result of the step 805B is "YES"), or if execution of the iSCSI session refresh process A has been completed, the processor 171 of the host computer 101 executes the health check control 200 included in the SCSI application 151 to transmit a health check SCSI command (step 807). The health check SCSI command of the step 807 may not be transmitted between the host computer 101 and the storage system 103, but a SCSI command unique to a vendor who provides a device may be transmitted instead. Accordingly, processing of the step 807 is indicated by a broken line.

The processor 171 of the host computer 101 transmits a health check iSCSI command for each TCP connection (step 808). The processor 171 starts a health check response wait timer for waiting for a response of the health check iSCSI command for each TCP connection (step 809).

Upon judging that a refresh method is at the time of multi-TCP connection (result of the step 802 is "TIME OF MULTI-TCP CONNECTION"), the processor 171 of the host computer 101 executes an iSCSI session refresh process B (step 830). A procedure of the iSCSI session refresh process B will be described below referring to FIG. 10. To execute health check, the process of the steps 803 and after is carried out upon completion of the iSCSI session refresh process B. If health check is not executed, this process may be finished.

If health check is judged not to be executed (result of the step 805B is "NO"), the processor 171 of the host computer 101 finishes this process.

If a process type is a start based on health check response reception (result of the step 801 is "HEALTH CHECK RESPONSE RECEPTION"), the processor 171 of the host computer 101 sets a value of a relevant TCP connection status 410 of a TCP connection 404 of the iSCSI session management table 206 to "NORMAL" (step 810). The processor 171 sets a relevant iSCSI session status 403 of an iSCSI session 401 to normal (step 811). Lastly, the processor 171 clears the health check response wait timer (step 812) to finish the process.

In the case of a start based on a timeout of the health check response wait timer (result of step 801 is "HEALTH CHECK TIMER TIME OUT"), the processor 171 of the host computer 101 sets a value of the relevant TCP connection status 410 of the TCP connection 404 of the iSCSI session management table 206 to "FAILURE" (step 820).

The processor 171 of the host computer 101 judges whether there is a normal TCP connection 404 in the iSCSI session 401 (step 821).

If there is a normal TCP connection 404 in the iSCSI session 401 (result of the step 821 is "YES"), the processor 171 of the host computer 101 sets a value of the relevant iSCSI session status 403 of the iSCSI session 401 to "NORMAL" (step 822). The processor 171 executes a TCP re-establishment process (not shown) for re-establishing the failed TCP connection (step 823) to finish the process.

If there is no other normal TCP connection 404 in the iSCSI session 401 (result of the step 821 is "NO"), the processor 171 of the host computer 101 sets a value of the relevant iSCSI session status 403 of the iSCSI session 401 to "FAILURE" (step 824). The processor 171 executes an iSCSI relogin process (not shown) for login the failed iSCSI session again (step 825) to finish the process.

Figure 9:
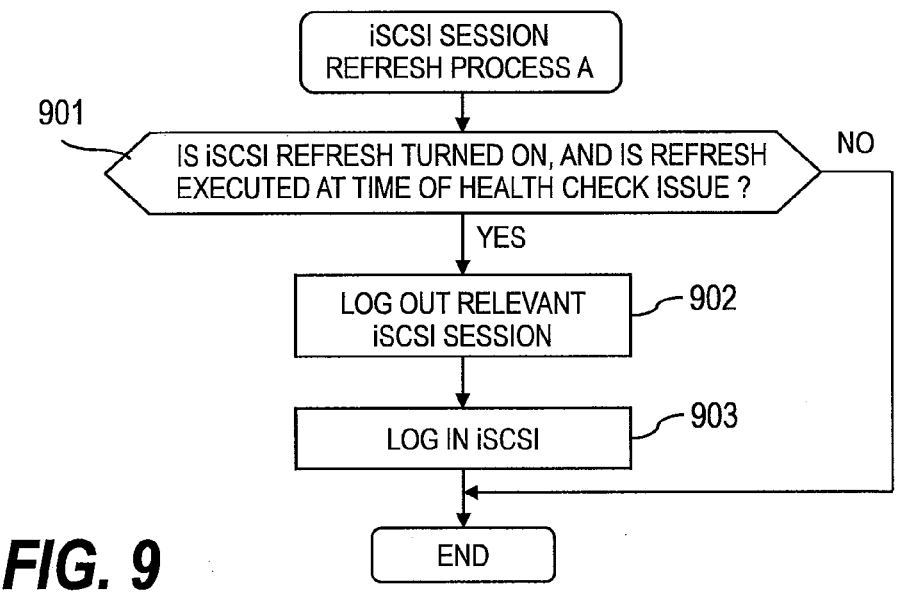
FIG. 9 is a flowchart showing a procedure of the iSCSI session refresh process in accordance with the first embodiment of this invention.

FIG. 9 is a flowchart illustrating a procedure of the iSCSI session refresh process A 806 according to the first embodiment of this invention.

The processor 171 of the host computer 101 judges, on the iSCSI refresh setting screen 300 shown in FIG. 3, whether execution of iSCSI refresh is "ON" and whether refresh is set to be executed at the time of health check issue (step 901). By judging whether refresh is set to be executed at the time of health check issue, the processor 171 can deal with a case where only health check is executed without executing refresh at the time of health check issue.

If refresh is set to be executed at the time of health check issue (result of the step 901 is "YES"), the processor 171 of the host computer 101 logs out an iSCSI session to be refreshed (step 902). The processor 171 logs in the iSCSI session again (step 903) to re-establish (refresh) the iSCSI session.

If refresh is set not to be executed at the time of health check issue (result of the step 901 is "NO"), the processor 171 of the host computer 101 finishes this process.

Figure 10:
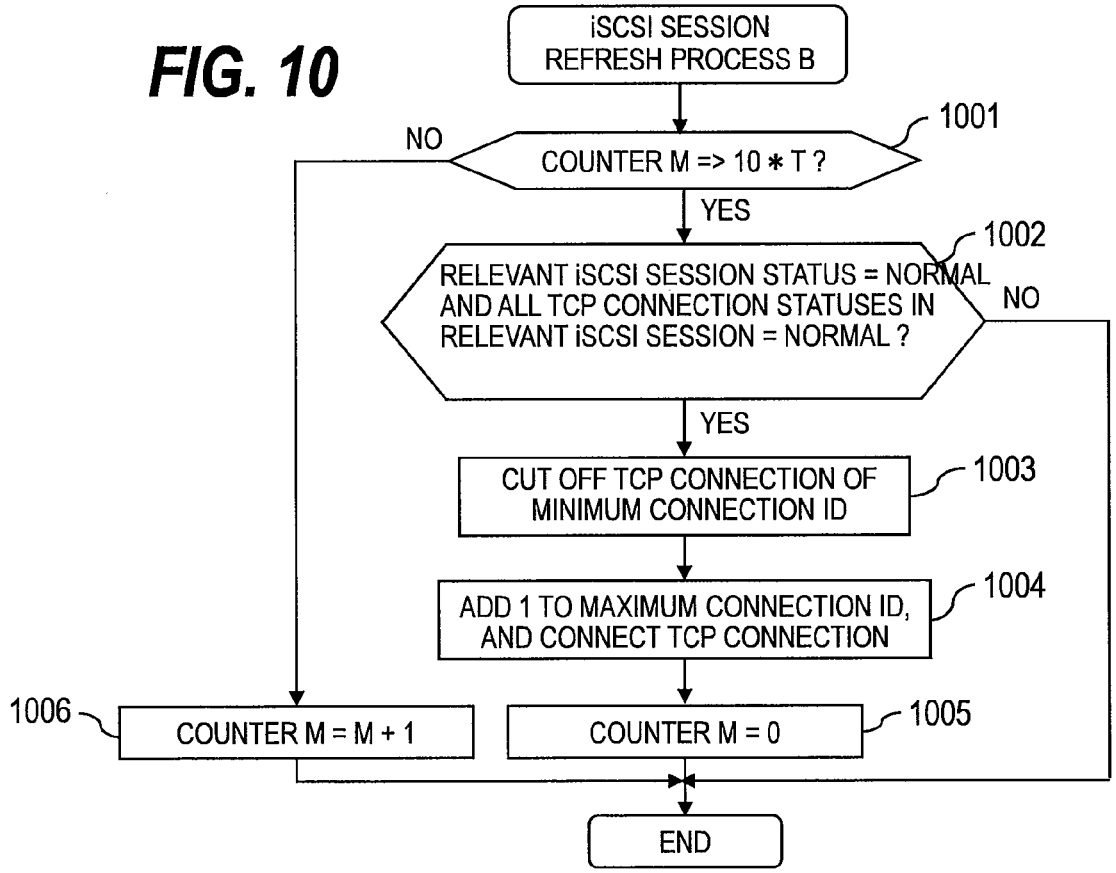
FIG. 10 is a flowchart illustrating a procedure of the iSCSI session refresh process in accordance with the first embodiment of this invention.

FIG. 10 is a flowchart illustrating a procedure of the iSCSI session refresh process B 830 according to the first embodiment of this invention.

The processor 171 of the host computer 101 judges whether to execute refresh (step 1001). The process will be described on the presumption that refresh is set to be executed every T seconds. For health check periodically started from the OS, a starting interval is 100 ms as described above. Accordingly, when 1 is added to a counter M for each loading of this process, a value of the counter M after a passage of T seconds is 10×T. Thus, when a value of the counter M is equal to or more than 10×T, refresh is executed. The counter M is set to 0 in an initializing process (not shown).

If the value of the counter M is less than 10×T (result of the step 1001 is "NO"), the processor 171 of the host computer 101 adds 1 to the counter M (step 1006) to finish the process.

If the value of the counter M is equal to or more than 10×T (result of the step 1001 is "YES"), the processor 171 of the host computer 101 judges whether a status of an iSCSI session is normal (step 1002). Specifically, the processor 171 of the host computer 101 refers to the iSCSI session management table 206 to judge whether an iSCSI session status 403 of a relevant iSCSI session 401 is "NORMAL", and whether TCP connection statuses 410 of all TCP connections 404 included in the relevant iSCSI session are all "NORMAL".

If the status of the iSCSI session and the statuses of all the TCP connections 404 included in the iSCSI session are normal (result of the step 1002 is "YES"), the processor 171 of the host computer 101 cuts off a TCP connection whose connection ID 405 is minimum among the TCP connections 404 (step 1003). The processor 171 of the host computer 101 connects (establishes) a TCP connection by setting a value obtained by adding 1 to a maximum value of a connection ID 405 included in the TCP connections 404 as a new connection ID 405 (step 1004). The processor 171 sets the counter M to 0 (step 1005) to finish the process. In the iSCSI session management table 206, values of the connection ID 405 are "C11" and "C12". Judgment of minimum and maximum values of the connection ID 405 are made based on numerical portions.

Figure 11:
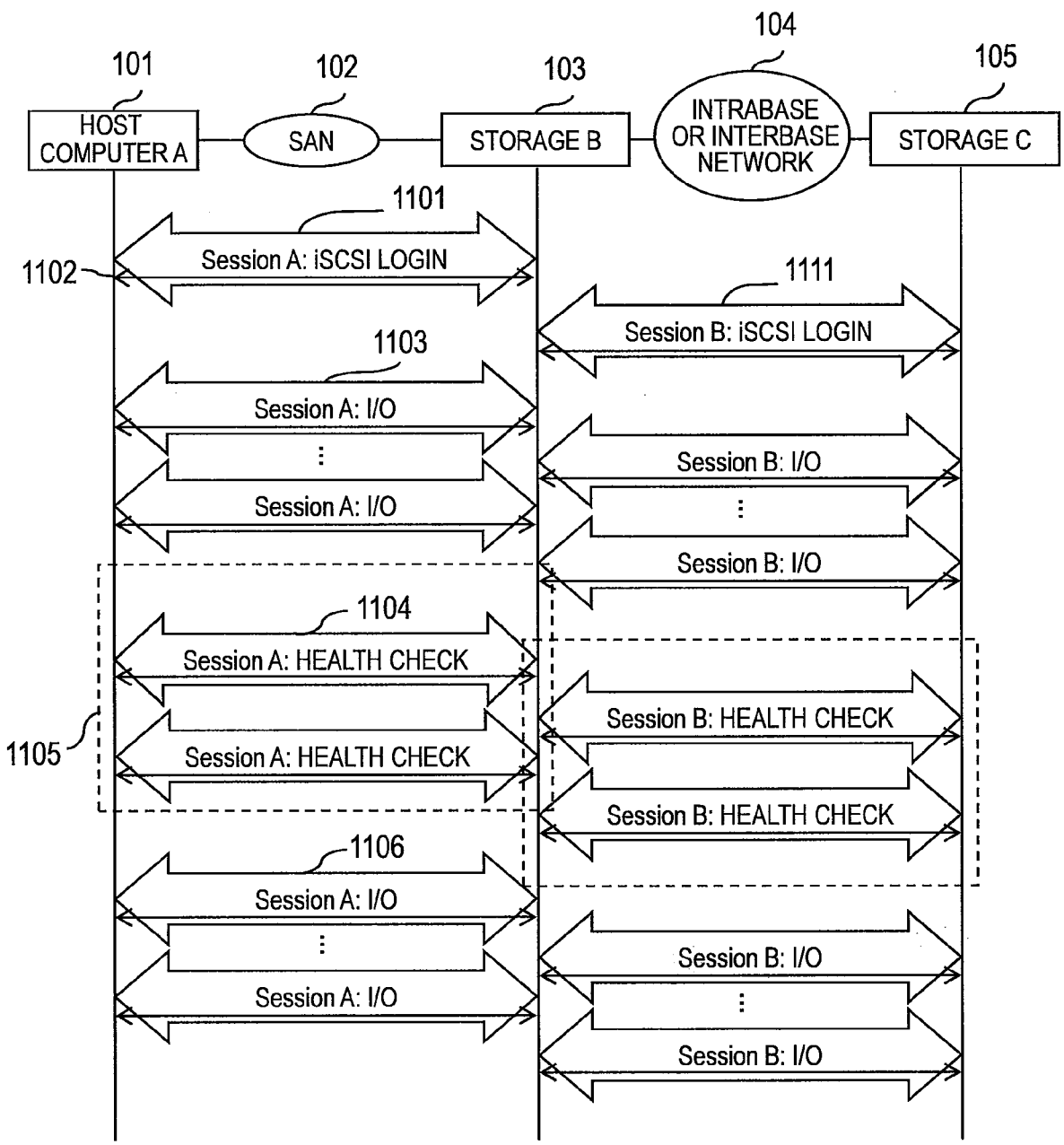
FIG. 11 is a sequence diagram showing examples of a session connection status and a series of processes from iSCSI login when normal health check control is executed in accordance with the first embodiment of this invention.
Figure 12:
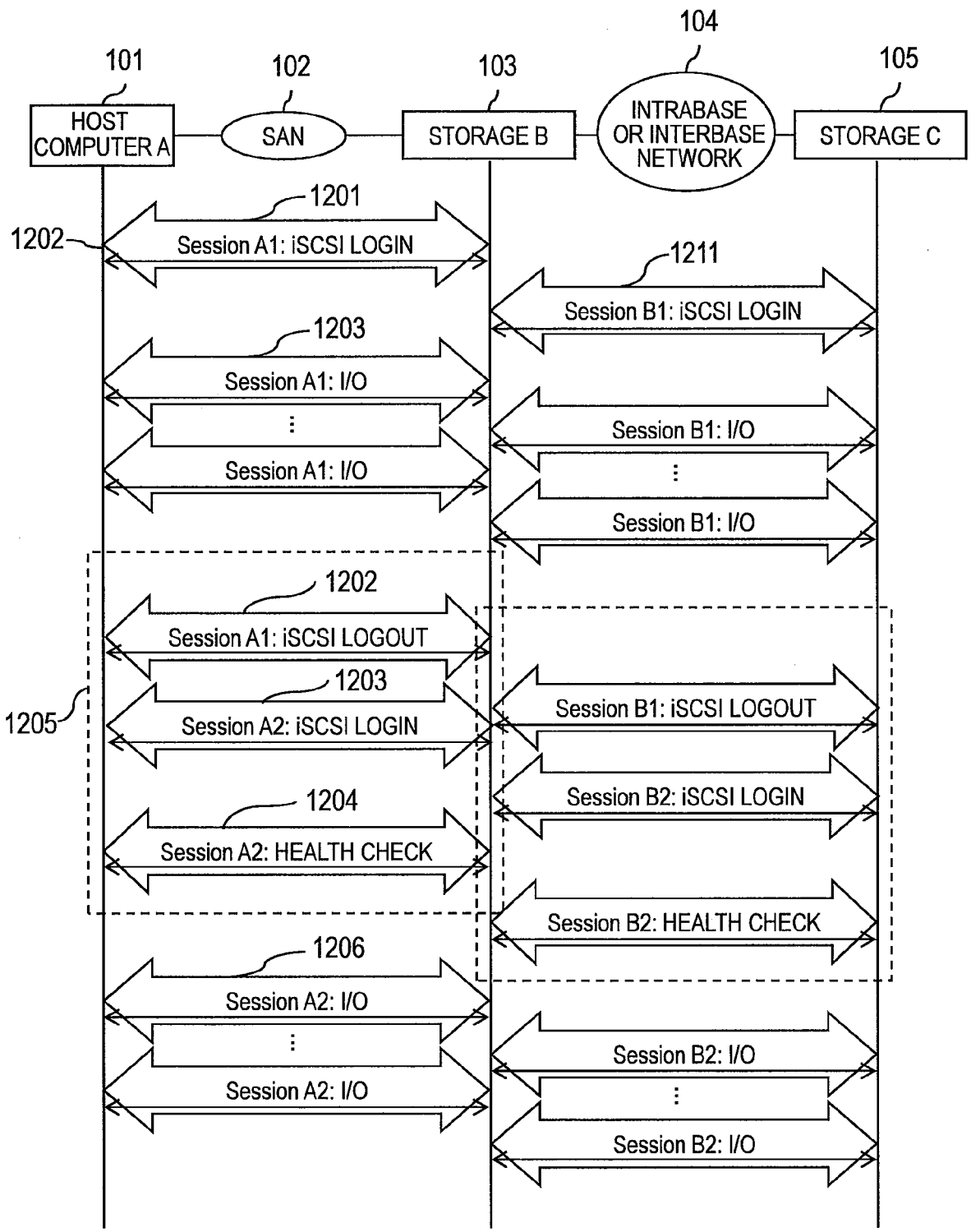
FIG. 12 is a sequence diagram showing examples of a session connection status and a series of processes from iSCSI login when an iSCSI refresh method is at the time of health check issue in accordance with the first embodiment of this invention.
Figure 13:
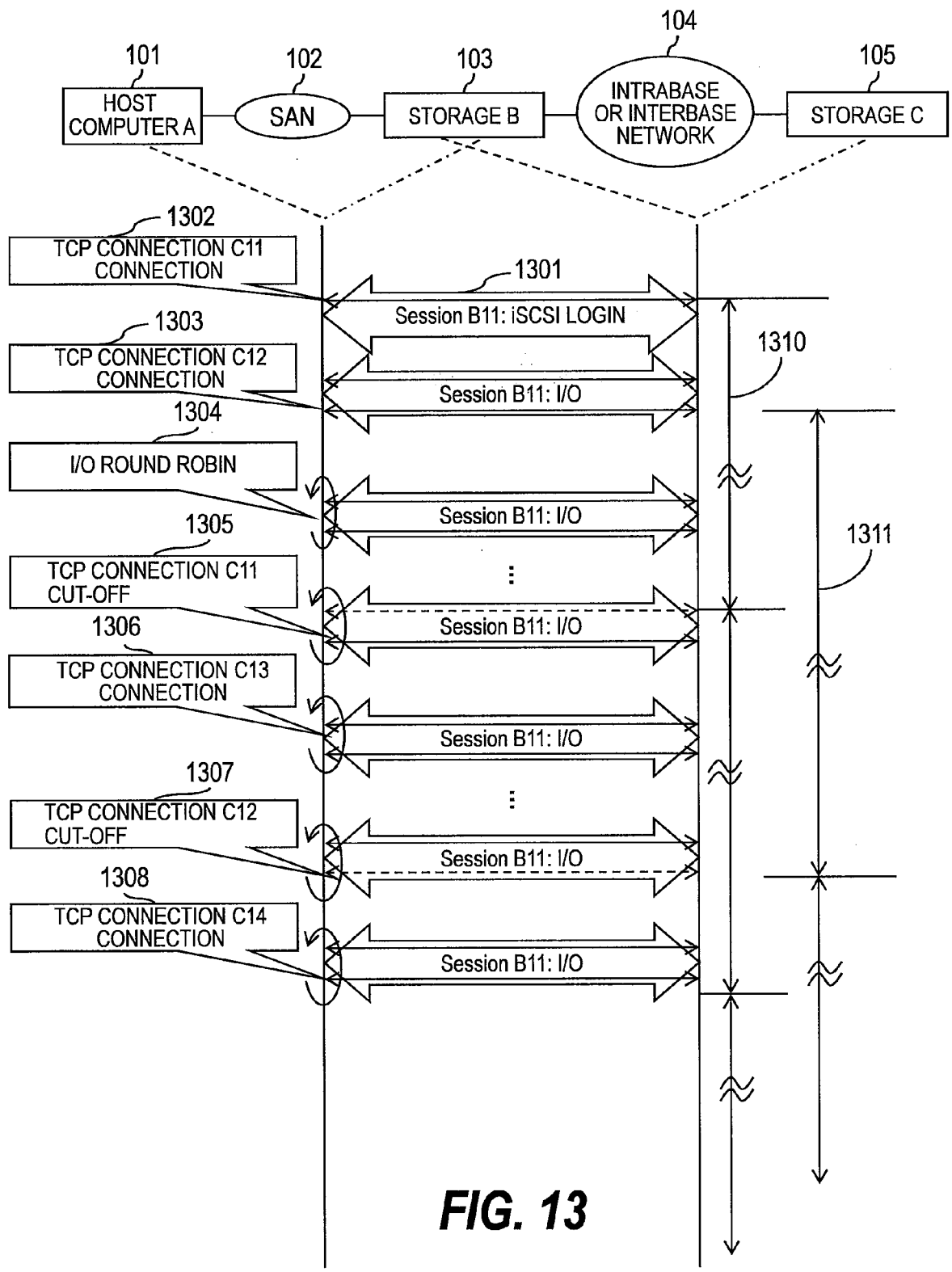
FIG. 13 is a sequence diagram showing examples of a session connection status and a series of processes from iSCSI login when an iSCSI refresh method is at the time of multi-TCP connection in accordance with the first embodiment of this invention.

Each of FIGS. 11 to 13 illustrates examples of an iSCSI session connected between the host computer 101 and the storage systems 103 and 105, a connection status of a TCP connection, and a series of processes from iSCSI login.

FIG. 11 illustrates examples of a session connection status and a series of processes from iSCSI login when normal health check control is executed according to the first embodiment of this invention.

Between the host computer 101 and the storage system 103, an iSCSI session 1101 includes a TCP connection 1102. Each of iSCSI sessions 1103 and 1106 indicates a flowing status of an I/O. In a period 1105 of no I/O flowing, an iSCSI command for executing health check is transmitted/received in an iSCSI session 1104. A process of an iSCSI session 1111 and after between the storage systems 103 and 105 is similar to that between the host computer 101 and the storage system 103.

As shown in FIG. 11, when refresh is not carried out, a session ID is not changed because an iSCSI session is maintained for a long time. Thus, a TCP connection is maintained for a long time, resulting in a greater security risk. Especially, if a TCP connection is maintained for a long time via an intrabase or interbase network as in the case between the storage systems 103 and 105, a security risk becomes much greater.

FIG. 12 illustrates examples of a session connection status and a series of processes from iSCSI login when an iSCSI refresh method is at the time of health check issue according to the first embodiment of this invention.

When an iSCSI session is refreshed at the time of health check issue the iSCSI is logged out before health check is carried out in a period 1205 of no I/O flowing to immediately execute a relogin process (refresh), which is different from the process shown in FIG. 11.

A situation where refresh of the iSCSI session during health check execution causes a change in value of a session ID is indicated by a numeral following an alphabet A or B shown next to "Session" of FIG. 12. The session ID changes from A1 to A2, or from B1 to B2. Thus, the iSCSI session is refreshed periodically not to be maintained for a long time.

FIG. 13 illustrates examples of a session connection status and a series of processes from iSCSI login when an iSCSI refresh method is at the time of multi-TCP connection according to the first embodiment of this invention.

Session connection statuses between the host computer 101 and the storage system 103 and between the storage systems 103 and 105 are similar to each other, and thus a common session connection status is shown in FIG. 13.

First, upon execution of iSCSI login, TCP connections C11 and C12 are established in an iSCSI session 1301 (steps 1302 and 1303) to establish a multi-TCP connection.

An identifier is added to the established TCP connection to correspond to the connection ID 405 of the iSCSI session management table 206. By referring to the iSCSI session management table 206, a TCP connection constituting the iSCSI session 1301 can be identified.

In such a multi-TCP connection, when data is input/output from the host computer 101 or the storage system 103 via the iSCSI session 1301, for example, TCP connections are allocated by round robin scheduling (step 1304).

After a passage of a period 1310 determined based on a variable T set in the refreshing frequency 305 of the iSCSI refresh setting screen 300, the TCP connection C11 is cut off (step 1305) to establish a new TCP connection C13 (step 1306). For the TCP connection C12, after a passage of the period 1310 from the cut-off of the TCP connection C11, the TCP connection C12 is cut off (step 1307) to establish a new TCP connection C14 (step 1308). If three or more TCP connections have been established, as long as one or more TCP connections are maintained with established statuses, a plurality of TCP connections may be cut off to be re-established.

If an iSCSI session is a multi-TCP connection, even when one TCP connection is cut off, data can be input/output by using established TCP connection. Thus, even when data is input/output, the TCP connections can be periodically refreshed. As shown in FIG. 13, the connection ID of the TCP connection C11 changes to the C13, and the connection ID of the TCP connection C12 changes to the C14. Accordingly, even if the iSCSI session is a multi-TCP connection, the iSCSI session can be periodically refreshed.

According to the first embodiment of this invention, the iSCSI session is re-established (logged out and logged in) at the timing of executing health check during the period when no SCSI command is transmitted/received for a certain period of time, and thus the iSCSI session can be refreshed. By refreshing the iSCSI session, long-time maintenance of the TCP connection can be prevented, thereby reducing a security risk.

According to the first embodiment of this invention, if the iSCSI session is a multi-TCP connection, the iSCSI session can be refreshed independently of the timing of executing health check.

According to the first embodiment of this invention, there is no need to mount an MD 5 authentication option or an IPsec, or to set packet filtering in the network device, and without increasing the number of developing or setting steps, a security risk can be reduced.

Second Embodiment

A second embodiment of this invention is different from the first embodiment in that a multi-iSCSI session is added to a possible refresh method.

An iSCSI session includes one or a plurality of TCP connections. An initiator and a target can be connected to each other by not only one but also a plurality of iSCSI sessions.

Description of contents of the second embodiment similar to those of the first embodiment will be omitted as occasion demands.

FIG. 14 illustrates, in detail, an iSCSI session management table 206 according to the second embodiment of this invention.

The iSCSI session management table 206 of FIG. 14 shows that iSCSI sessions having iSCSI session ID's 402 of B1 (1401) and B2 (1402) constitute a multi-iSCSI session.

In the iSCSI session constituting the multi-iSCSI session, a transmission source IP address 406, a transmission destination IP address 408, and a transmission destination TCP port 409 match one another. When an iSCSI session is re-established, a transmission source TCP port 407 is changed.

It is presumed that the second embodiment of this invention is applied in a status where the iSCSI sessions having the iSCSI session ID's 402 of B1 and B2 constitute the multi-iSCSI session. Thus, description of a process and a screen for selecting iSCSI sessions to constitute a multi-iSCSI session will be omitted.

In an iSCSI refresh setting screen 300, in addition to the components of the first embodiment shown in FIG. 3, "TIME OF MULTI-iSCSI SESSION" is newly added to a refresh method 304. Other components are the same.

According to the second embodiment of this invention, health check is carried out as in the case of the health check control process of the first embodiment shown in FIG. 8. However, in the branching process of the possible refresh method 411 of the step 802, a case where the refresh method 304 is "AT TIME OF MULTI-iSCSI SESSION" is added. In this case, an iSCSI session refresh process C which is a multi-iSCSI session refresh process is carried out. After the end of the process, the process of the step 803 and after is executed. A procedure of the iSCSI session refresh process C will be described below referring to FIG. 15.

Figure 15:
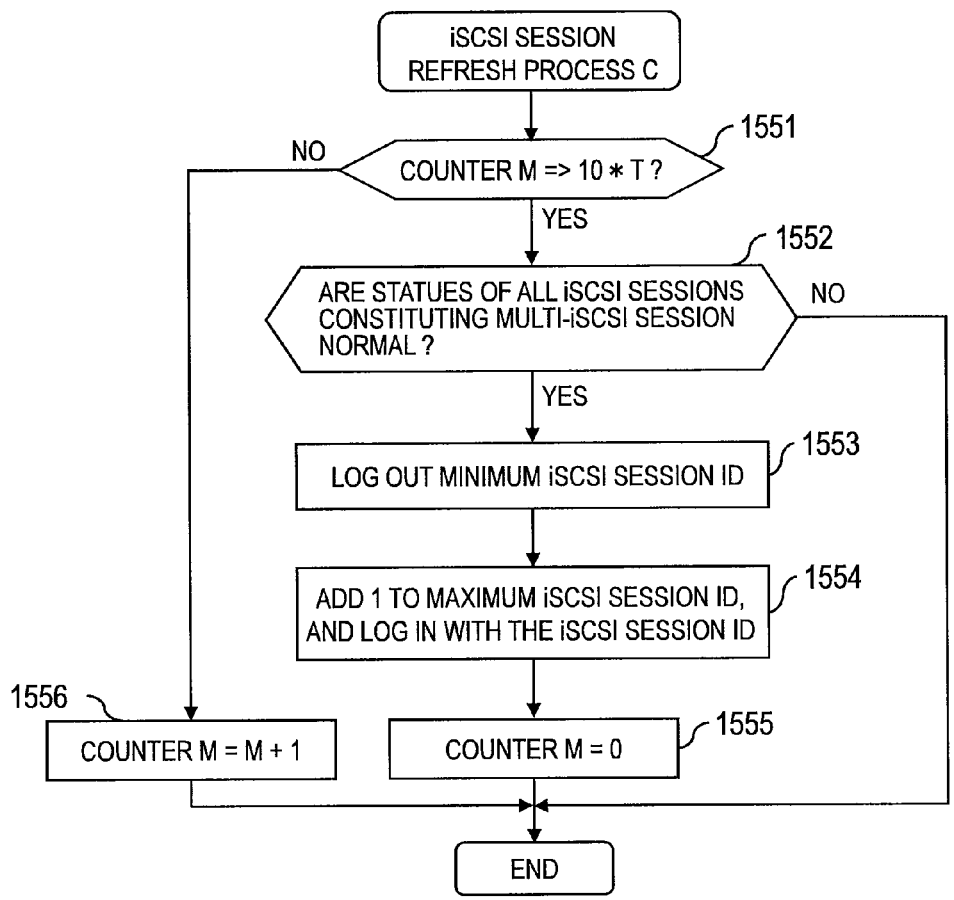
FIG. 15 is a flowchart showing a procedure of the iSCSI session refresh process in accordance with the second embodiment of this invention.

FIG. 15 is a flowchart illustrating the procedure of the iSCSI session refresh process C according to the second embodiment of this invention.

A processor 171 of a host computer 101 judges whether to execute refreshing (step 1551). In this process, refresh is executed every T seconds, and processing of the step 1551 is similar to that of the step 1001 of FIG. 10. If no refresh is carried out, in other words, if a value of a counter M is less than 10×T (result of the step 1551 is "NO"), as in the case of the processing of the step 1006 of FIG. 10, 1 is added to the counter M (step 1556) to finish the process.

If refresh is executed, in other words, if a value of the counter M is equal to or more than 10×T (result of the step 1551 is "YES"), the processor 171 of the host computer 101 judges whether statuses of all the iSCSI sessions constituting the multi-iSCSI session are normal (step 1552). Specifically, the processor 171 refers to the iSCSI session management table 206 to judge whether an iSCSI session status 403 of an iSCSI session 401 constituting the multi-iSCSI session is "NORMAL".

If the statuses of all the iSCSI sessions constituting the multi-iSCSI session are normal (result of the step 1552 is "YES"), the processor 171 of the host computer 101 logs out the iSCSI session whose session ID 402 is minimum (step 1553). The processor 171 logs in with a value obtained by adding 1 to a maximum value of a session ID 402 of an iSCSI session constituting the multi-iSCSI session as a new session ID 402 (step 1554). Lastly, the processor 171 sets the counter M to 0 (step 1555) to finish the process.

Figure 16:
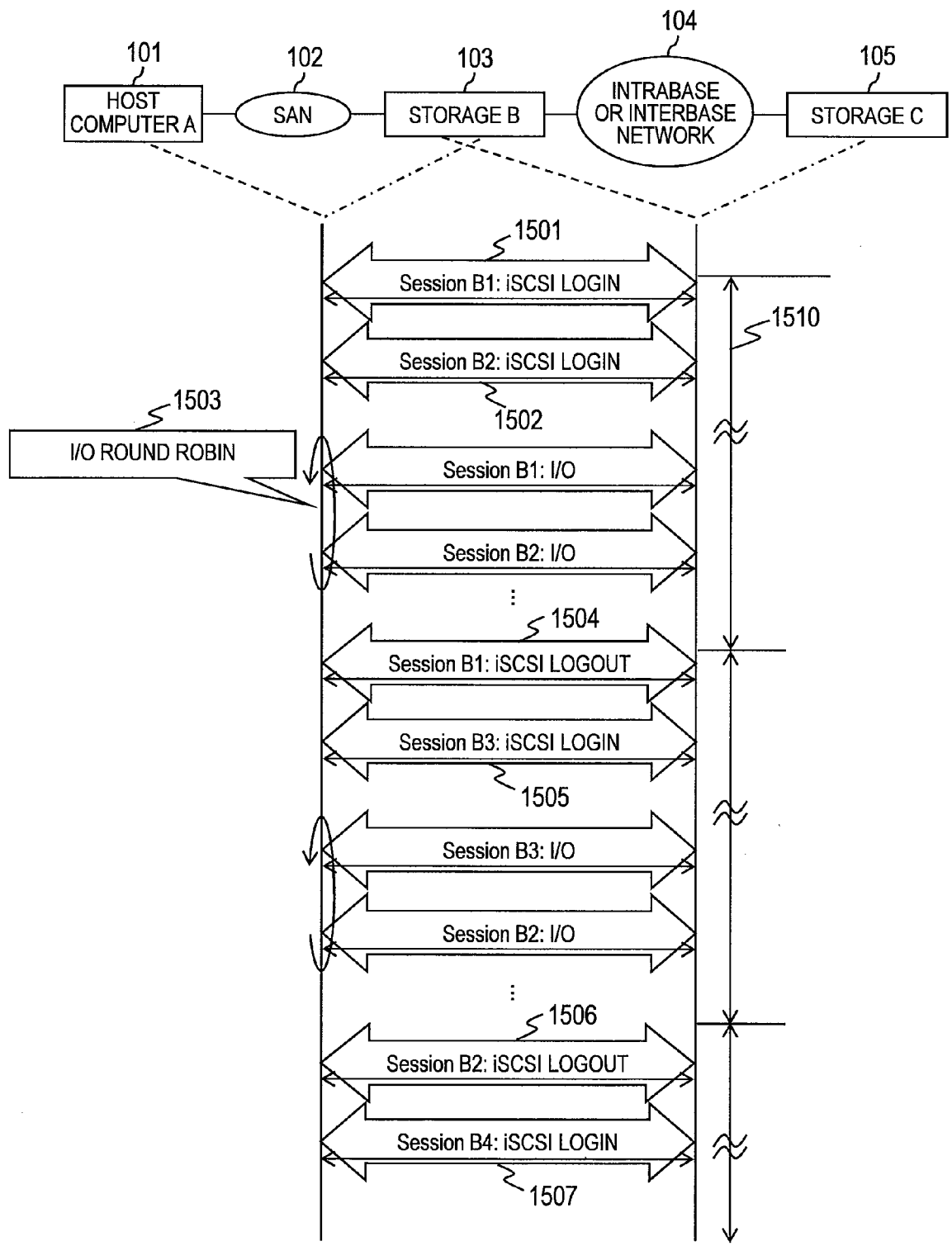
FIG. 16 is a sequence diagram showing examples of a session connection status and a series of processes from iSCSI login when an iSCSI refresh method is at the time of a multi-iSCSI session in accordance with the second embodiment of this invention.

FIG. 16 illustrates examples of a session connection status and a series of processes from iSCSI login when an iSCSI refresh method is at the time of a multi-iSCSI session according to the second embodiment of this invention.

In FIG. 16, as in the case of FIG. 13, session connection statuses between the host computer 101 and the storage system 103 and between the storage systems 103 and 105 are similar to each other, and thus a common session connection status is shown.

First, iSCSI login is executed for each of iSCSI sessions B1 and B2 (1501 and 1502) to constitute a multi-iSCSI session.

In such a multi-iSCSI session, when data is input/output from the host computer 101 or the storage system 103, for example, iSCSI sessions are allocated by round robin scheduling (step 1503).

After a passage of a period 1510 determined based on a variable T set in a refreshing frequency 305 of an iSCSI refresh setting screen 300, the iSCSI session B1 is logged out, and login is executed by an iSCSI session B3. After another passage of the period 1510, the iSCSI session B2 is logged out, and login is executed by an iSCSI session B4. A similar process is repeated thereafter.

In the case of the multi-iSCSI session, as data can be input/output by using another connected iSCSI session even if one iSCSI session is logged out, iSCSI sessions can be periodically logged out and logged in. Thus, if one or more iSCSI sessions are maintained with established statuses when three or more iSCSI sessions are connected, a plurality of iSCSI sessions may be logged out, and logged in again.

As shown in FIG. 16, the session ID of the iSCSI session B1 changes to B3, and the session ID of the iSCSI session B2 changes to B4.

According to the second embodiment of this invention, even in the case of the multi-iSCSI session, as in the case of the first embodiment, by periodically refreshing the iSCSI sessions, long-time maintenance of a connection can be prevented, and a security risk can be reduced.

While the present invention has been described in detail and pictorially in the accompanying drawings, the present invention is not limited to such detail but covers various obvious modifications and equivalent arrangements, which fall within the purview of the appended claims.

What is claimed is:

1. An iSCSI session management method for a computer system including an initiator, and a storage system coupled to the initiator via a network,
the initiator including a first interface coupled to the network, a first processor coupled to the first interface, and a first memory coupled to the first processor,
the storage system including a second interface coupled to the network, a second memory coupled to the second interface, and a second processor coupled to the second memory,
the iSCSI session management method comprising the steps of:
executing, by the initiator, health check for diagnosing a status of an iSCSI session, whose session ID is a first session ID, established between the initiator and the storage system, by sending an iSCSI command for health check, when an iSCSI command queue of the iSCSI session is empty for a first predetermined period; and
executing, by the initiator, logout from the iSCSI session and then login to the iSCSI session so that the session ID of the iSCSI session is changed from the first session ID to a second session ID which is different from the first session ID, at a timing of executing the health check, when the iSCSI command queue of the iSCSI session is empty for a second predetermined period which is longer than the first predetermined period.

2. The iSCSI session management method according to claim 1, further comprising the step of communicating, by the initiator, with the storage system in accordance with an iSCSI protocol.

3. The iSCSI session management method according to claim 2, wherein:
the iSCSI session includes a plurality of TCP connections; and
the iSCSI session management method further comprises the step of periodically cutting off and re-establishing, by the initiator, while maintaining at least one of the plurality of TCP connections included in the iSCSI session, one of the plurality of TCP connections included in the iSCSI session.

4. The iSCSI session management method according to claim 3, further comprising the step of cutting off and re-establishing, by the initiator, one of the plurality of TCP connections in order of decreasing length of a connection period of each of the plurality of TCP connections to the storage system.

5. The iSCSI session management method according to claim 2, further comprising the steps of:
communicating, by the initiator, with the storage system by a plurality of the iSCSI sessions; and
periodically executing, by the initiator, logoff from one of the plurality of the iSCSI sessions and login to the one of the plurality of the iSCSI sessions, while maintaining at least one of the iSCSI sessions connected to the storage system.

6. The iSCSI session management method according to claim 5, further comprising the step of executing, by the initiator, logoff from one of the plurality of the sessions and login to the one of the plurality of the sessions in order of decreasing length of a connection period to the storage system.

7. The iSCSI session management method according to claim 1, further comprising the step of receiving, by the initiator, at least one of the first predetermined period and the second predetermined period.

8. A storage system coupled to another storage system via a network, comprising:
an interface coupled to the network;
a memory coupled to the interface; and
a processor coupled to the memory,
wherein the processor is configured to:
execute health check for diagnosing a status of an iSCSI session, whose session ID is a first session ID, established between the storage system and the another storage system, when an iSCSI command queue of the iSCSI session is empty for a first predetermined period; and
execute logout from the iSCSI session and then login to the iSCSI session so that the session ID of the iSCSI session is changed from the first session ID to a second session ID which is different from the first session ID, at a timing of executing the health check, when the iSCSI command queue of the iSCSI session is empty for a second predetermined period which is longer than the first predetermined period.

9. The storage system according to claim 8, wherein the storage system is configured to communicate with the another storage system in accordance with an iSCSI protocol.

10. The storage system according to claim 9, wherein:
the iSCSI session includes a plurality of TCP connections; and
the processor is further configured to periodically cut off and re-establish, while maintaining at least one of the plurality of TCP connections included in the iSCSI session, one of the plurality of TCP connections included in the iSCSI session.

11. The storage system according to claim 10, wherein the processor is further configured to cut off and re-establish one of the plurality of TCP connections in order of decreasing length of a connection period of each of the plurality of TCP connections to the another storage system.

12. The storage system according to claim 9,
wherein the processor is further configured to:
communicate with the another storage system by a plurality of the iSCSI sessions; and
periodically execute logoff from one of the plurality of the iSCSI sessions and login to the one of the plurality of the iSCSI sessions, while maintaining at least one of the iSCSI sessions is connected to the storage system.

13. The storage system according to claim 12, wherein the processor is further configured to execute logoff from one of the plurality of the iSCSI sessions and login to the one of the plurality of the iSCSI sessions in order of decreasing length of a connection period to the another storage system.

14. The storage system according to claim 8, wherein the processor is further configured to receive at least one of the first predetermined period and the second predetermined period.

15. A computer system comprising:
an initiator; and
a storage system coupled to the initiator via a network, wherein:
the initiator includes a first interface coupled to the network, a first processor coupled to the first interface, and a first memory coupled to the first processor;
the storage system includes a second interface coupled to the network, a second memory coupled to the second interface, and a second processor coupled to the second memory; and
the initiator is configured to:
execute health check for diagnosing a status of an iSCSI session, whose session ID is a first session ID, established between the initiator and the storage system, when an iSCSI command queue of the iSCSI session is empty for a first predetermined period; and executing, by the initiator, logout from the iSCSI session and then login to the iSCSI session so that the session ID of the iSCSI session is changed from the first session ID to a second session ID which is different from the first session ID, at a timing of executing the health check, when the iSCSI command queue of the iSCSI session is empty for a second predetermined period which is longer than the first predetermined period.

* * * * *